Dec. 11, 1945. A. ALDERMAN 2,390,767
CULTIVATOR ATTACHMENT FOR TRACTORS
Filed Aug. 23, 1944 3 Sheets-Sheet 1

INVENTOR.
ARTIS ALDERMAN
BY Edward M Apple
ATTORNEY

Dec. 11, 1945.  A. ALDERMAN  2,390,767
CULTIVATOR ATTACHMENT FOR TRACTORS
Filed Aug. 23, 1944  3 Sheets-Sheet 2

INVENTOR.
ARTIS ALDERMAN
BY
Edward M. Apple
ATTORNEY

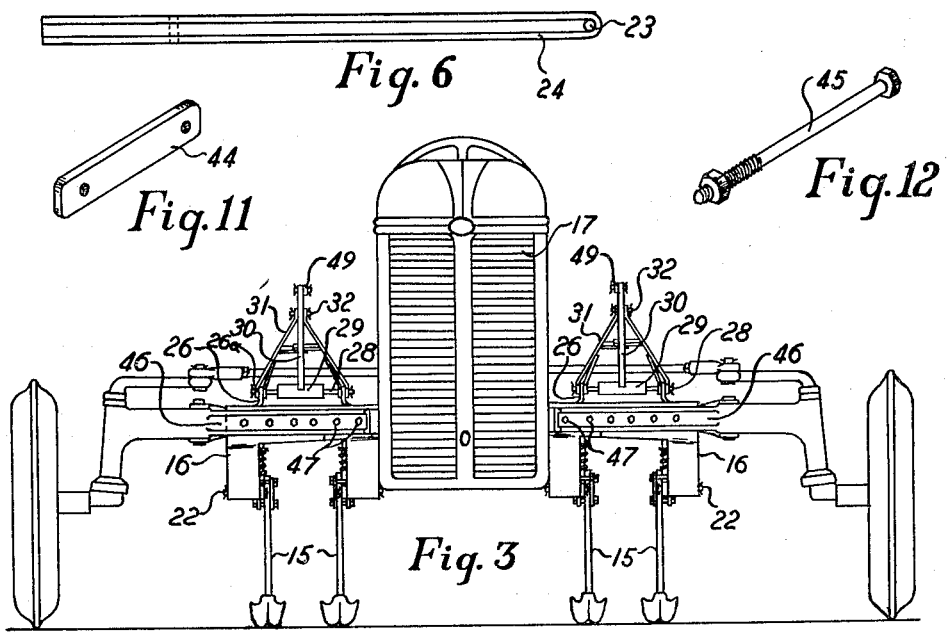
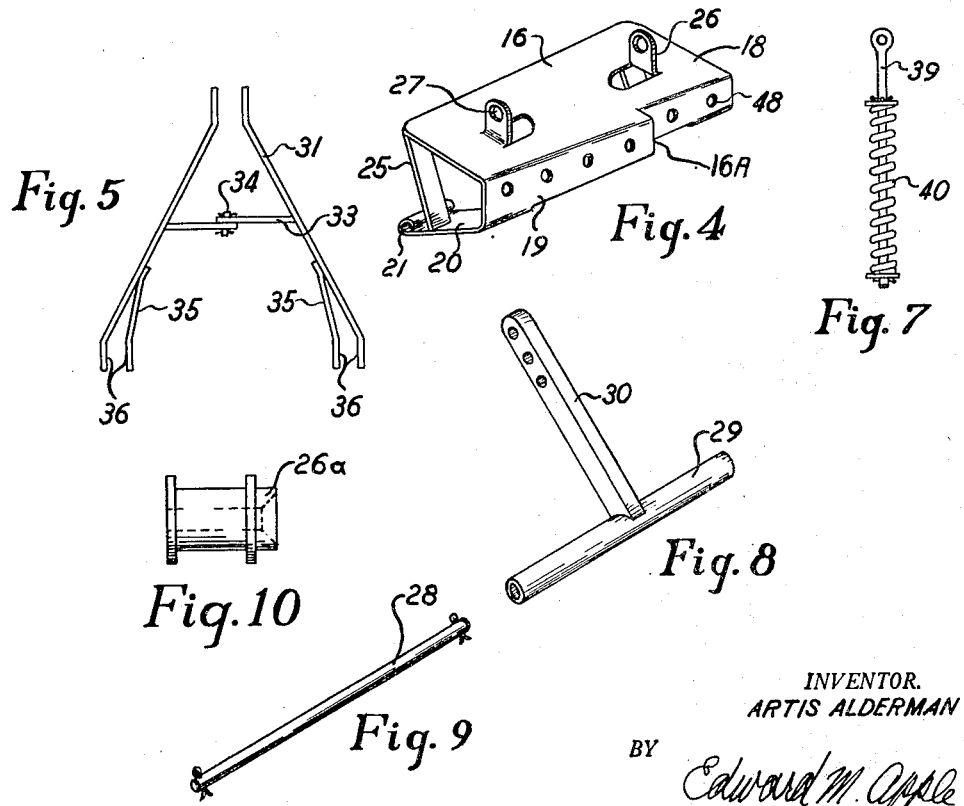

Patented Dec. 11, 1945

2,390,767

UNITED STATES PATENT OFFICE 2,390,767

CULTIVATOR ATTACHMENT FOR TRACTORS

Artis Alderman, Lincoln Park, Mich.

Application August 23, 1944, Serial No. 550,773

4 Claims. (Cl. 97—47)

This invention relates to cultivating tractors and has particular reference to a Ford tractor.

An object of the invention is to provide a cultivating attachment which is adapted to be applied to the front axle of a Ford-Ferguson tractor.

Another object of the invention is the provision of a cultivating attachment for a Ford tractor which may be installed for operation in front of and within the full view of the tractor operator.

Another object of the invention is the provision of a front end cultivator attachment for a Ford-Ferguson tractor which is adapted to be controlled by the Ford-Ferguson hydraulic mechanism.

Another object of the invention is the provision of a cultivator attachment for a Ford tractor which is simple in construction, inexpensive to manufacture, and easy to install and dismantle.

The foregoing and other objects and advantages of the invention will appear as the description proceeds, reference being made from time to time to the accompanying drawings forming part of the within disclosure, in which drawings:

Fig. 3 is a front elevation of the device illustrated in Figs. 1 and 2.

Fig. 4 is an enlarged perspective view of one of the mounting brackets.

Fig. 5 is an enlarged plan view of one of the bi-furcated members used to assist in the support of the plow carrying arm.

Fig. 6 is a side elevation of one of the plow carrying arms.

Fig. 7 is an enlarged detail of one of the rods used to support the plow carrying arm shown in Fig. 6.

Fig. 8 is an enlarged perspective view of the T shaped member used to support one end of the bi-furcated member shown in Fig. 5.

Fig. 9 is an enlarged detail of the rod used to support the T shaped member shown in Fig. 8.

Fig. 10 is an enlarged detail of one of the bearing members used to support the rod shown in Fig. 9.

Fig. 11 is an enlarged detail of one of the clamp members used to secure the plow foot to the plow supporting arm shown in Fig. 6.

Fig. 12 is an enlarged detail of one of the clamp bolts used to secure the plow foot to the plow supporting arm.

Figure 1:
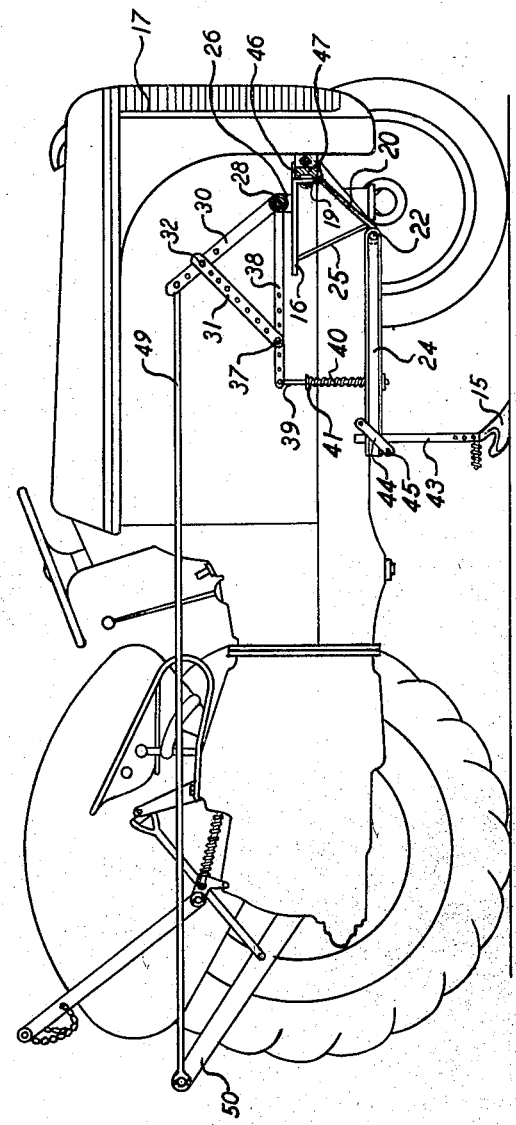
Fig. 1 is a side view, with parts removed, showing a Ford-Ferguson tractor equipped with my improved cultivating device.

Referring now more particularly to the drawings, it will be understood that a pair of plow feet 15 is secured to the front axle of the tractor by means of a bracket 16 (Fig. 4) positioned at either side of the radiator 17 as hereinafter described.

Each mounting bracket 16 is provided with an offset portion 16a which is adapted to accommodate the overlapped ends of the front axle of the Ford tractor. Each bracket 16 (Fig. 4) is constructed of a length of heavy gauge metal bent and rebent to form a top section 18, a front section 19, and an angular bottom section 20, the latter being rolled as at 21 to accommodate a rod 22, which engages an aperture 23 (Fig. 6) formed in the end of the bracket supporting arm 24 so that the latter is free to pivot on the rod 22.

A re-enforcing member 25, preferably a piece of angle iron, is positioned between, and welded to, the upper section 18 and the lower section 20 of the mounting bracket 16.

Lugs 26 (Fig. 4) are stamped from the upper section 18 of the mounting bracket 16 and are bent to a right angle position with reference to the upper section 18, and are provided with apertures 27 adapted to accommodate the rod 28 which in turn supports the T shaped member (Fig. 8) which comprises a tubular section 29 and an apertured rod 30 which are secured to one another by welding or other suitable means. Bearing members 26a (Fig. 10) are provided for the lugs 26 to prevent excessive wear.

Figure 2:
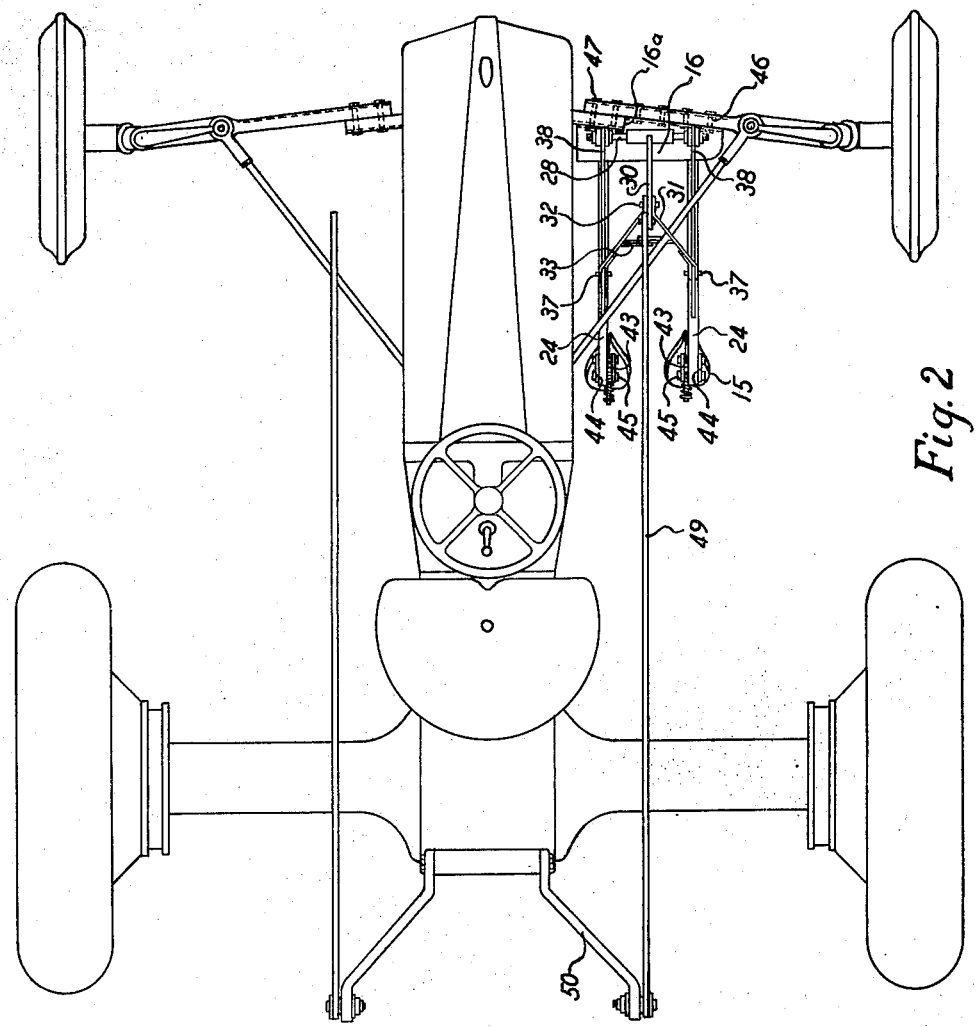
Fig. 2 is a plan view of the device illustrated in Fig. 1.

The apertured member 30 supports one end of a bifurcated member 31 (Fig. 5) which is also apertured (Fig. 1) to provide various positions of adjustment. The member 30 (Figs. 1, 2, and 3) is bolted to the bifurcated member 31 as at 32.

The two sections comprising the bifurcated member 31 (Fig. 5) are joined by means of the overlapping members 33 which are adjustably attached to one another by means of a bolt 34, which is adapted to engage a series of apertures formed in the members 33, so that the sections of the bifurcated member 31 may be moved toward or away from each other to provide a greater or lesser clearance between the divergent ends thereof. This adjustment permits the plow feet 15 of each pair to be spaced at different distances from one another for different types of work.

The divergent ends of the bifurcated member 31 (Fig. 5) are provided with short sections 35 of similar material which are bent to conform to the divergent ends of the bifurcated member 31 and are secured thereto by welding or other suitable means.

The divergent ends of the bifurcated member 31 and the members 35 are provided with apertures 36 which are adapted to accommodate bolts 37 (Figs. 1 and 2) by which the ends of the bifurcated member 31 are respectively secured to a pair of arms 38, one end of each arm 38 being supported by the rod 28, which in turn is supported by the ears 26 as previously described.

The opposite end of the arm 38 supports a rod 39 (Fig. 1) which in turn supports the free end of the plow carrying arm 24. A spring 40 is interposed on the rod 39 between the arm 24 and a fixed abutment 41, and allows a resilient retraction of the plow supporting arm 24.

The plow foot 15, having an upwardly extending shank 43, is mounted to the plow supporting arm 24 by means of a clamp comprising matched bars 44 and bolts 45.

The assembly just described is secured to the front axle 46 by means of bolts 47 which extend through the axle 46 and the apertures 48 formed in the front section 19 of the mounting bracket 16. The arm 30 is connected to a rod 49 which is in turn connected to the lever 50 comprising part of the Ford-Ferguson hydraulic mechanism, so that the movable parts of the cultivator assembly just described may be rocked upwardly out of operating position.

In utilizing the cultivating device just described, I prefer to remove the plow feet of the regular Ferguson cultivator which would ordinarily cultivate the rows intended to be cultivated with my improved device.

With my improved device, a crop can be easily cultivated without the necessity of the operator looking back to view his alignment with the rows being cultivated. With this device, the operator can cultivate much closer to the crops without the danger of damaging them.

It is obvious from the foregoing description that I have devised a simple and practical front end cultivator for the Ford tractor. This device is easily attached to and detached from the tractor by the simple expedient of a few bolts.

It is also constructed in such a manner that it can be lifted out of working position with the same hydraulic mechanism which lifts the regular Ferguson cultivator.

Having described my invention, what I desire and claim to secure by Letters Patent is:

1. In combination with a tractor having an adjustable front axle and a hydraulic mechanism, a mounting bracket secured to said front axle, plow supporting arms pivoted to said bracket, plow feet secured to said arms, lugs on said bracket, secondary arms pivoted to said lugs for movement in common vertical planes with said arms, resilient means connecting the free ends of said plow carrying arms and said secondary arms, a lever pivoted to said bracket, means to connect said lever with said hydraulic mechanism, and means to connect said lever to said secondary arms, said last-named means being adjustable so that varying degrees of force may be exerted on said secondary arms.

2. In combination with a tractor having an adjustable front axle and a hydraulic mechanism, a mounting bracket secured to said front axle, plow supporting arms pivoted to said bracket, plow feet secured to said arms, lugs on said bracket, secondary arms pivoted to said lugs for movement in common vertical planes with said arms, resilient means connecting the free ends of said plow carrying arms and said secondary arms, a lever pivoted to said bracket, means to connect said lever with said hydraulic mechanism, and means to connect said lever to said secondary arms, said last-named means including a bi-furcated member having diverging ends, and means for adjusting the divergence of said ends.

3. In combination with a tractor having an adjustable front axle and a hydraulic mechanism, a mounting bracket secured to said front axle, plow supporting arms pivoted to said bracket, plow feet secured to said arms, lugs on said bracket, secondary arms pivoted to said lugs for movement in common vertical planes with said arms, resilient means connecting the free ends of said plow carrying arms and said secondary arms, a lever pivoted to said bracket, means to connect said lever with said hydraulic mechanism, and means to connect said lever to said secondary arms, said last-named means comprise a diverging bi-furcated member, pivoted at one end to said lever, and secured at each of the diverging ends to one of said secondary arms.

4. In combination with a tractor having an adjustable front axle and a hydraulic mechanism, a mounting bracket secured to said front axle, plow supporting arms pivoted to said bracket, plow feet secured to said arms, lugs on said bracket, secondary arms pivoted to said lugs for movement in common vertical planes with said arms, resilient means connecting the free ends of said plow carrying arms and said secondary arms, a lever pivoted to said bracket, means to connect said lever with said hydraulic mechanism, and means to connect said lever to said secondary arms, said last-named means comprising a diverging bi-furcated member pivoted at one end to said lever, and secured at each of the diverging ends to one of said secondary arms, there being means for adjusting the relation between said lever and said bi-furcated member and between said bi-furcated member and said secondary arms.

ARTIS ALDERMAN.